Jan. 1, 1952             A. I. SIIMES             2,581,303
MACHINE FOR SHAKING SIEVES AND THE LIKE, OPERABLE
BY A RELATIVELY INCOMPRESSIBLE LIQUID

Filed May 22, 1946                       2 SHEETS—SHEET 1

AARNE IMMANUEL SIIMES
INVENTOR

BY
his ATTORNEY

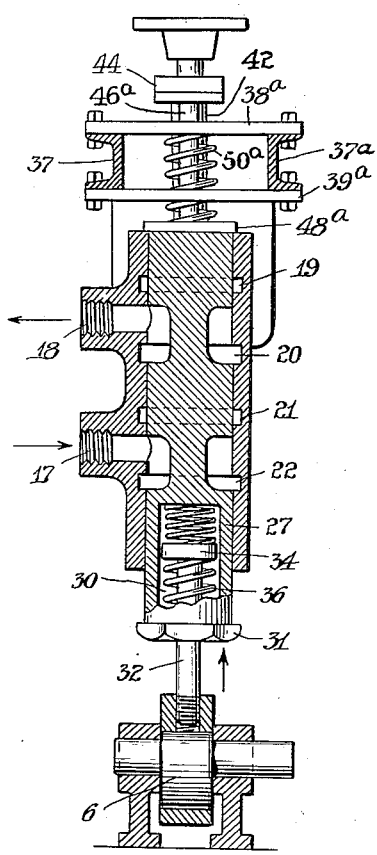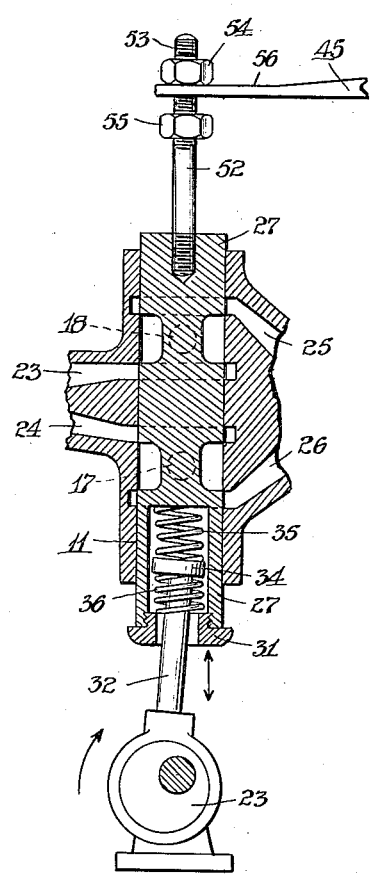

Patented Jan. 1, 1952

2,581,303

UNITED STATES PATENT OFFICE 2,581,303

MACHINE FOR SHAKING SIEVES AND THE LIKE, OPERABLE BY A RELATIVELY INCOMPRESSIBLE LIQUID

Aarne Immanuel Siimes, Mantta, Suomi, Finland

Application May 22, 1946, Serial No. 671,439½
In Finland June 1, 1945

1 Claim. (Cl. 121—147)

The present invention relates to a hydraulic reciprocating mechanism which may be used to operate shaking sieves for sorting minerals or for various purposes in the pulp and paper industry, and also wherever rapid reciprocal movements of machine parts are to be effected by hydraulic power.

One object of the invention is to provide a reciprocating mechanism which can be driven from a source of hydraulic fluid under constant pressure, and in which a substantially continuous flow of hydraulic fluid through the mechanism takes place, thus avoiding undesirable shock and resonance effects.

Another object of the invention is to provide a hydraulic reciprocating mechanism in which a reversible valve admits hydraulic fluid alternately to two control chambers in such a manner that the valve is retarded in its positions permitting the flow of hydraulic liquid and is passed rapidly through its intermediate positions in which it prevents the flow of the hydraulic fluid.

Still another object of the invention is to provide a hydraulic mechanism operated by a continually reciprocating member, which latter transmits its movements through the intermediary of springs to a valve controlling the flow of the hydraulic fluid.

These and other objects, which will appear more clearly as the specification proceeds, are accomplished according to the present invention by means of the arrangement and combination of elements set forth in the following detailed description, defined in the appended claims and illustratively exemplified in the accompanying drawings, in which:

Fig. 2 is a vertical section taken on line 2—2 of Fig. 1; and

Fig. 3 is a view similar to that of Fig. 1 with parts broken away and showing an auxiliary regulating element.

Figure 1:
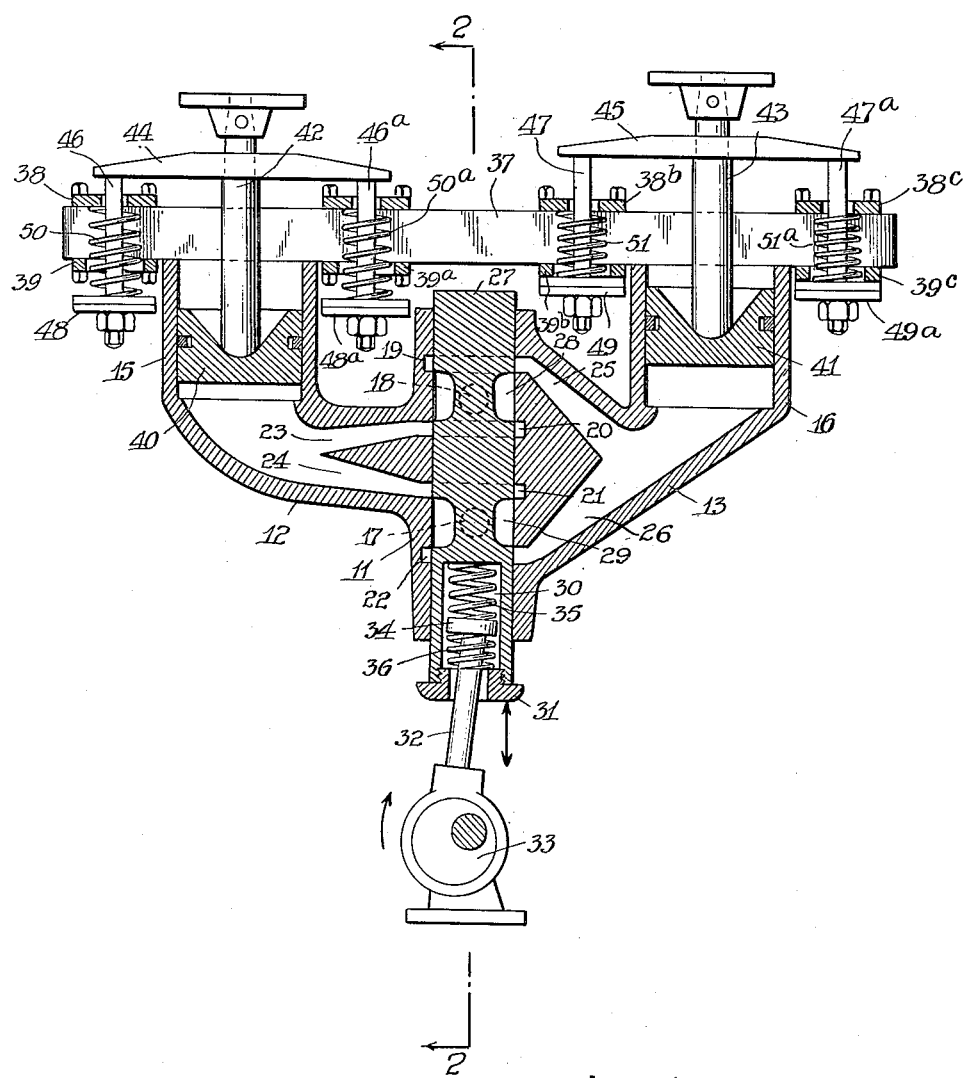
Fig. 1 is a vertical section through a device according to the invention.

Referring now to the drawings, and first to Figs. 1 and 2, 11 is a substantially cylindrical valve casing formed on two diametrically opposite sides with hollow bracket arms 12 and 13 which support two cylindrical control chambers 15 and 16. The valve casing 11 is provided with an inlet port 17 adapted to be connected to a source of hydraulic fluid under constant pressure, such as a water tap, and with a discharge port 18 for the hydraulic fluid. Four peripheral grooves 19, 20, 21 and 22 are provided at spaced intervals in the inner surface of the valve casing 11. The interior of the bracket 12 is connected by means of two conduits 23 and 24 to openings in the valve casing 11 leading into the peripheral grooves, 20 and 21 respectively, while the interior of bracket 13 is connected through conduits 25 and 26 to openings in the valve casing 11 leading into the peripheral grooves 19 and 22 respectively. A slide valve 27 is arranged for reciprocal movement in the valve casing 11 and provided with two annular recesses 28 and 29. When the valve 27 assumes its upper end position in the valve casing 11, recess 29 connects the inlet port 17 with the inlet conduit 24 of bracket 12, thus admitting hydraulic fluid to the control chamber 15. Simultaneously, recess 28 connects outlet conduit 25 of bracket 13 and control chamber 16 with the discharge port 18, thus permitting the discharge of hydraulic fluid from this chamber 16. In the lowermost position of slide valve 27, on the other hand, the recess 29 connects the inlet port 17 to the inlet conduit 26 of bracket 13, and thus to control chamber 16, while the upper recess 28 connects control chamber 15 over outlet conduit 23 of bracket 12 to the discharge port 18.

The slide valve 27 is provided at its lower end with a cylindrical recess 30 which is provided at its open edge with an inwardly projecting peripheral flange formed by a centrally perforated nut 31, screwed into the threaded open end of the recess 30. A reciprocating rod 32, which is actuated by an eccentric 33, projects through the central perforation of the nut 31 into the recess 30 and carries at its upper end a head 34. A spring 35 is arranged between the head 34 and the peripheral flange formed by the inner face of the nut 31.

Two U-profile beams 37, 37a are secured, for instance, by welding, to the upper peripheral edges of the control chambers 15 and 16 as seen in Figs. 1 and 2. The two beams 37 and 37a are connected together on opposite sides of each control chamber 15, 16 by means of two pairs of cross-bars 38, 38a; 38b, 38c, on top of the beams 37, 37a, and two similar pairs of crossbars 39, 39a; 39b and 39c, below the beams 37, 37a.

The control chambers 15 and 16 are closed by pistons 40 and 41 slidable therein. A piston rod 42, 43 projects upwardly from each piston 40, 41, to a level above the upper cross-bars 38, 38a, 38b and 38c. A cross-piece 44, 45 is mounted on each piston rod 42, 43, respectively, and extends over the adjacent upper cross-bars 38, 38a and 38b, 38c, respectively. Bolts 46, 46a, 47, 47a project downwardly from the ends of the cross-pieces 44 and 45 through apertures of small diameter in the upper cross-bars 38, 38a, 38b and 38c and apertures of greater diameter in the lower cross-bars 39, 39a, 39b and 39c. Discs 48, 48a, 49, 49a are mounted on the lower ends of the bolts 46, 46a, 47, 47a and support the lower ends of helical springs 50, 50a, 51, 51a which extend through the springs in the lower cross-bars 39, 39a, 39b, 39c, and rest with their upper ends against the lower surfaces of the cross-bars 38, 38a, 38b and 38c, respectively. Thus, the cross-pieces 44, 45 with the piston rods 42, 43 and the pistons 40 and 41 are urged downwardly for a displacement of the pistons 40 and 41 inwardly into the control chambers 15 and 16.

The device operates as follows:

When the eccentric 33 rotates in the direction indicated by the arrow in Fig. 1, the rod 32 is given a reciprocating movement substantially in the direction of the double arrow. This movement is transmitted to the slide valve 27 by means of the springs 35 and 36. When the slide valve 27 reaches its uppermost position the spring 35 is compressed and the inlet port 17 is connected to the inlet conduit 24 of control chamber 15 while the outlet conduit 25 of control chamber 16 is connected to the discharge port 18. Thus, the hydraulic fluid passing from inlet port 17 through conduit 24 into cylinder chamber 15 displaces the piston 40 upwardly against the force of springs 50, 50a while simultaneously springs 51 and 51a force the piston 41 downwardly, causing the hydraulic fluid contained in chamber 16 to be discharged through conduit 25 and discharge port 18.

When the rod 32 starts its downward return movement, the slide valve 27 will not begin to move until the spring 36 has become sufficiently compressed to transfer the motion of the head 34 to the nut 31 and thus to the slide valve 27. Thereafter, the reaction of springs 35 and 36 moves the slide 27 rapidly to its lowermost position. As a result of this arrangement the slide valve 27 assumes the intermediate position shown in Fig. 1, in which no hydraulic fluid can flow to or from either chamber 15 or 16 for very short intervals only.

With the slide valve 27 in its lowermost position, the outlet conduit 23 of control chamber 15 is connected to the discharge port 18 and the inlet conduit of the control chamber 16 is connected to the inlet port 17. It will thus be seen that the direction of movement of the pistons 40, 41 in the two chambers 15 and 16 is alternately reversed without causing any noticeable change of pressure in the inlet and outlet ports 17 and 18. The reciprocal movements may continue in rapid succession and the slide valve 27 may carry out up to 600 strokes per minute.

As the slide valve 27 is hydraulically balanced, there is little or no friction, and the danger of leakage is minimized because hydraulic fluid flows substantially continuously through some conduit from inlet 17 to outlet 18 so that gaskets may be dispensed with.

Due to the substantially continuous flow of hydraulic liqiud in the inlet and outlet ports, shocks, resonance phenomena or other losses of energy in the supply and discharge pipes are obviated. Another advantage of the continuous flow of hydraulic fluid is that impurities present in the hydraulic liquid do not stick between the slide valve and the valve casing because the continuously flowing liquid always carries them along and eventually out of the system.

Fig. 3 shows a modification in which the movement of one of the pistons (41) is utilized for the control of the slide valve. For this purpose a bolt 52 projects upwardly from the slide valve 27 and carries on its upper screw threaded end 53 two nuts 54 and 55. An extension 56 of the cross-piece 45 embraces the bolt 52 between the two nuts 54 and 55 and limits the relative movements of the slide valve 27 relative to the cross-piece 45. The stroke of the slide valve 27 can be regulated by adjusting the nuts 54 and 55 on the screw threaded portion 53 of the bolt 52.

It will be understood that the device may be varied in numerous respects without departing from the scope of the present invention, for instance by substituting diaphragms for the pistons 40 and 41 or by varying the means for urging the pistons into the control chamber. It is not intended to limit the scope of the invention to the illustrated embodiment except as expressed in the following claim.

What is claimed is:

Hydraulic reciprocating mechanism, operable by a relatively incompressible liquid, comprising a valve casing having an inlet port to be connected to a source of hydraulic fluid under substantially constant pressure and a hydraulic fluid discharge port, two similar control chambers, conduits connecting said two chambers with said valve casing, a movable closure element in each chamber, means urging each movable closure element into the associated chamber, a slide valve reciprocable in said valve casing and provided with passages to connect, in one position thereof, said inlet port with a conduit leading to one of said chambers and said discharge port with a conduit leading to the second chamber and, in another position thereof, said inlet port with a conduit leading to said second chamber and said discharge port with a conduit leading to said first chamber, and means to reciprocate said slide valve rhythmically in said valve casing in which said two positions of the slide valve are its end positions and said slide valve is provided with an axial recess and carries at a distance from the inner end of said recess and inwardly projecting flange, said means for reciprocating said slide valve including a reciprocating rod projecting into said recess and having at its inner end a head, a spring between said head and the inner end of said recess, and a second spring between said head and said inwardly projecting flange, incluing a first control member movable with said slide valve and projecting from said valve casing, a second control member carried by one of said closure elements outside of the associated control chamber, and an adjustable abutment on one of said control members arranged for cooperation with the other control member to regulate the stroke of said slide valve.

AARNE IMMANUEL SIIMES.

REFERENCES CITED

The following references are of record in the file of this patent:

UNITED STATES PATENTS

| Number | Name | Date |
|---|---|---|
| 382,547 | Morton | May 8, 1888 |
| 423,515 | Colborne | Mar. 18, 1890 |
| 746,158 | Reed | Dec. 8, 1903 |
| 776,159 | Whiteside | Nov. 29, 1904 |
| 1,799,113 | Miedbrodt | Mar. 31, 1931 |